Patented Nov. 17, 1942

2,302,530

UNITED STATES PATENT OFFICE 2,302,530

AZO DYE

Moses L. Crossley, Plainfield, N. J., assignor, by mesne assignments, to American Cyanamid Company, New York, N. Y., a corporation of Maine No Drawing. Original application March 29, 1937, Serial No. 133,559½. Divided and this application August 29, 1941, Serial No. 408,821

14 Claims. (Cl. 260—173)

This invention relates to new polyazo dyes containing higher alkyl phenols as a component.

Many polyazo dyes have been prepared in the past using phenol or methylated phenols as components. According to the present invention it has been found that polyazo dyes having at least one phenol with an alkyl chain of more than 2 carbon atoms give dyes of good shades with excellent properties such as milling, fastness to light, washing and the like. While valuable dyes may be produced from phenols having as short an alkyl chain as three carbon atoms, the most important dyes are those which contain alkyl phenols with still longer hydrocarbon chain, particularly the amyl and octyl phenols.

The new dyes of the present invention may contain solubilizing groups and it is an important advantage of this form of the invention that many of the dyes containing solubilizing groups will dye cellulose acetate as well as animal fibers. This is a very important property of certain of the colors falling under the present invention because as is well known, the dyeing of cellulose acetate presents a serious problem and has hitherto required special insoluble dyes which were used in a dispersed form thus greatly reducing the choice of shades which could be obtained satisfactorily with cellulose acetate and requiring a special dyeing procedure.

The soluble dyes of the present invention also have an important property of great light fastness and fastness to washing even in sea water. This makes it possible to use the soluble dyes for dyeing wool which must withstand sea water, as for example, bathing suits.

The present invention is not limited to the number of azo groups contained in the polyazo dye. Commercially the most important dyes falling under the present invention are of course, the disazo dyes as the cost of producing dyes with more azo groups is considerably higher which mitigates against their use where a satisfactory shade can be obtained with a less complex dye. The higher azo dyes are, however, included and share the advantages of the longer alkyl chain phenol coupling components.

The dyes may contain one higher alkyl phenol or a plurality and a wide variety of diazo and tetrazo compounds may be used in preparing the dyes. These compounds may have solubilizing groups or other substituents such as nitro, chlor, hydroxy and the like. The dyes which do not contain solubilizing groups give water insoluble azo dyes. These products are in general soluble in organic solvents such as alcohols and aromatic hydrocarbons giving colored solutions usually varying in shade from yellow to bluish red. The solubility in aromatic hydrocarbons is a very important property of these dyes, and while I do not wish to limit my invention to any particular theory, I believe that the increased solubility in aromatic hydrocarbons is in considerable part due to the long alkyl chain.

The diazo components may also contain metallizable groups and very fast dyes are obtained by metallizing azo dyes of the present invention which contain suitable metallizable groups.

Very useful dyes are obtained by coupling one or more higher alkyl phenols with tetrazo compounds such as, for example, benzidines, tolidines, or dianisidines. Where no solubilizing groups are present, dyes are obtained which possess the same important property of solubility in aromatic hydrocarbons as are noted in the monoazo dyes.

Tetrazo compounds may also be used to produce more complex disazo dyes by having a higher alkyl phenol as one end component, and a phenol naphthol or naphthol derivative as the second end component. Similarly, the second end component may be a pyrazolone which permits the production of desirable shades of yellow and orange. Where the second component does not contain a water solubilizing group, dyes are obtained which possess considerable solubility in aromatic hydrocarbons although usually not to the same extent as in the case of the dyes where both of the end components are higher alkyl phenols.

A further class of end components which may be included in disazo dyes of the present invention are the primary, secondary, and tertiary aromatic amines such as diphenylamine, alpha and betanaphthylamine and dialkyl amines such as dimethylanilines.

Disazo dyes containing a single higher alkyl phenol may also be produced by coupling a diazotized amino azo compound with a higher alkyl phenol. Such disazo dyes show, to a considerable extent, the hydrocarbon solubility which characterizes the dyes of the present invention which have solubilizing groups.

More complex azo dyes, such as trisazo dyes, may be produced by the coupling of tetrazo compounds with a higher alkyl phenol as one component and with a compound containing an azo group as the second component. Tetrakisazo dyes may be produced from tetrazo compounds and higher alkyl phenols when an end component is used which contains two azo groups, for example, the product obtained by diazotizing aminoazobenzene and coupling it on to resorcinol and then using the resulting compound as the second component.

Polyazo dyes of the present invention containing solubilizing groups are also of importance such as for example, those containing sulfonic or carboxylic acid groups. Metallizable azo dyes may also be produced where two or more of the components of the dye contain metallizable groups and these metallized azo dyes show excellent fastness to light.

This invention is a division of my copending application Serial No. 133,559½ filed March 29, 1937, now Patent 2,266,413 of Dec. 16, 1941.

The invention will be described in greater detail in conjunction with the following typical examples.

EXAMPLE 1

An amount of amino azobenzene sulfonic acid containing 28 parts of real is dissolved in 1500 parts of water at 85° C. The solution is acidified with 42 parts of 20° Bé. hydrochloric acid at 65° C. The reaction product is diazotized at this temperature with sufficient nitrite to give a positive endpoint on starch iodide paper at the end of 10 minutes. The diazo is coupled at 0° with 18 parts of tertiary amyl phenol dissolved in 1000 parts of water containing 14 parts of caustic and cooled to 0° C. with ice. The reaction product is made acid to Brilliant Yellow paper with acetic acid. The dye partially precipitates and is completely salted out with sodium chloride. It is filtered and dried. It is soluble in water and dyes wool and silk orange tones and cellulose acetate yellow. It has the following structural formula:

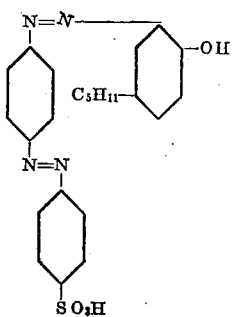

EXAMPLE 2

80 parts of real amino azo benzene, 2000 parts of water and 960 parts of concentrated hydrochloric acid are slurried together, cooled to 17° C. and diazotized with sodium nitrite at about 10° C. About half of the nitrite is added in 20 minutes and the remainder added slowly until a positive endpoint was obtained which held for ten minutes. The diazo solution is filtered and added to the amyl phenol solution containing 72 parts of ortho tertiary amyl phenol in 2000 parts of water containing 56 parts of caustic. When the coupling is complete the product is filtered and dried. It is insoluble in water; quite soluble in benzene, sparingly soluble in methyl alcohol and quite soluble in nitrocellulose lacquer, giving orange colored solutions. The dye has the following structural formula:

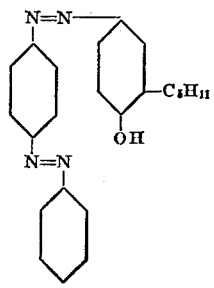

EXAMPLE 3

An amount of H acid equivalent to 128 kg. of real is dissolved in 1500 liters of water, and the solution is made slightly alkaline with 16 kg. of caustic soda. To this solution is added 400 liters of normal nitrite solution. The entire mixture is then added gradually to a cold concentrated hydrochloric acid solution containing 224 liters of concentrated hydrochloric acid. The reaction is maintained at a temperature of approximately 10° C. A solution of ortho tertiary amyl phenol is prepared by dissolving 38 kg. of the phenol and 52 kg. of caustic in 2000 liters of water. This was cooled to 0° and the diazo solution added slowly. When the coupling is complete the dye is precipitated by the addition of salt. It is then filtered and dried. It is water soluble and dyes wool and silk yellowish tones of brown but does not dye cellulose acetate. It has the following structural formula:

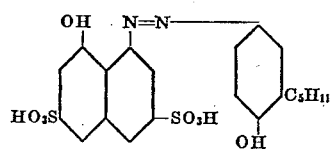

An alkaline solution containing 200 parts of the dye is prepared and to it is added a diazo solution prepared as follows: An amount of ortho aminophenol para sulfonic acid equivalent to about 76 parts real is dissolved in 1500 parts of water containing sodium carbonate sufficient to dissolve the product. The solution is then acidified with 156 parts of concentrated hydrochloric acid and cooled with ice to 0° C. Sodium nitrite is then added slowly until a positive endpoint for completion of the diazotization is obtained and remains positive for 10 minutes. The temperature was maintained at 10° C. The reaction is strongly alkaline to phenolphthalein. When the coupling is complete the dye is salted out and dried. It is soluble in water, dyes wool and silk bluish red tones. It has the following structural formula:

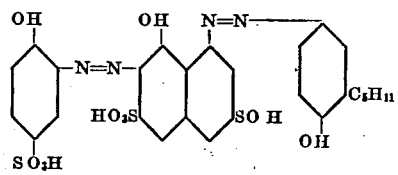

The dye obtained contains a pair of metallizable hydroxyl groups ortho to one azo group. It is, therefore, converted into valuable metallized derivatives by treating it with a compound of the required metal, e. g. 40 parts of dye are suspended in 1200 parts of water and then treated with 15 parts of copper sulfate crystals and 9 parts of sodium acetate. The solution is boiled for one hour and the resulting product is then salted out of solution with sodium chloride. The resulting dye is soluble in water producing a brownish yellow color. It dyes animal fibers bluish red tones of exceptional fastness, especially to light. Similar results are obtained by substituting for the copper, chromium, nickel, cobalt, manganese, vanadium, titanium, zirconium, aluminum, tin and iron. The colors obtained with these metals vary from red to dark brown depending on the metal used.

EXAMPLE 4

34 parts of benzidine-2,2' disulfonic acid are mixed with 500 parts of water and 40 parts of a 20% solution (by weight) of sodium hydroxide. The mixture is stirred and cooled by the addition of ice to between 10 and 15° C. 90 parts of a 16% hydrochloric acid solution is added. The mixture is then treated with sodium nitrite until a positive test is secured, indicating that diazotization is complete. A solution is then prepared with 36 parts of amyl phenol and 28 parts of caustic in 1000 parts of water. It is cooled to 0° C. and the diazo solution run in slowly until coupling is complete. The reaction is maintained strongly alkaline to phenolphthalein and the temperature is maintained between 10 and 15° C. The dye is salted out. It is soluble in water and dyes wool and silk a yellowish tone of orange. It has the following structural formula:

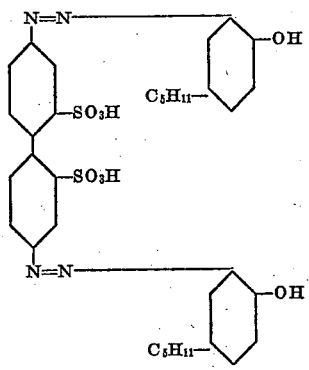

Other typical examples of alkyl phenol azo dyes are the following:

The following table illustrates a number of other typical dyes which can be prepared by the general process described in the foregoing examples:

*Table*

| No. | Formula | Color |
|---|---|---|
| 1 |  | Bluish red. |
| 2 |  | Reddish blue. |
| 3 |  | Orange. |
| 4 |  | Reddish blue. |

| No. | Formula | Color |
|---|---|---|
| 5 | | Yellowish red. |
| 6 | | Bluish red. |
| 7 | | Red. |
| 8 | | Bluish red. |

| No. | Formula | Color |
|---|---|---|
| 9 | | Yellowish red. |
| 10 | | Red. |

I claim:
1. A polyazo dye having the following formula:

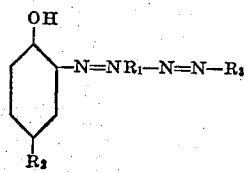

in which $R_3$ is an aromatic radical free from azo groups, $R_2$ is an alkyl chain having more than two carbon atoms and $R_1$ is a radical included in the group consisting of aromatic radicals free from azo groups and aromatic monoazo aromatic radicals.

2. A polyazo dye having the following formula:

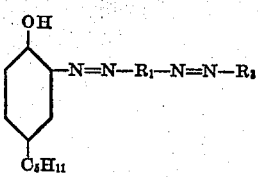

in which $R_1$ is a radical included in the group consisting of aromatic radicals free from azo groups and aromatic monoazo aromatic radicals and $R_3$ is an aromatic radical free from azo groups.

3. A polyazo dye having the following formula:

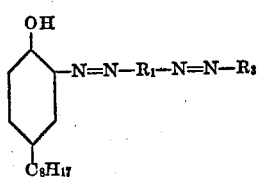

in which $R_1$ is a radical included in the group consisting of aromatic radicals free from azo groups and aromatic monoazo aromatic radicals and $R_3$ is an aromatic radical free from azo groups.

4. A disazo dye having the following formula:

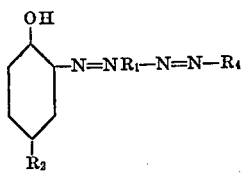

in which $R_1$ is an aromatic radical, $R_2$ is an alkyl chain having more than two carbon atoms, and $R_4$ is an aromatic radical free from azo groups.

5. A disazo dye having the following formula:

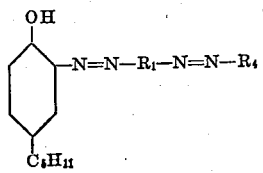

in which $R_1$ is an aromatic radical and $R_4$ is an aromatic radical free from azo groups.

6. A disazo dye having the following formula:

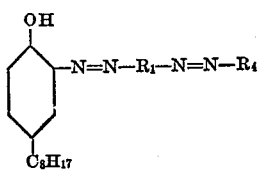

in which $R_1$ is an aromatic radical and $R_4$ is an aromatic radical free from azo groups.

7. A disazo dye having the following formula:

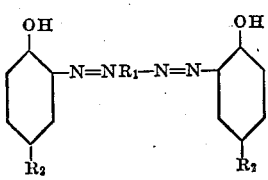

in which $R_1$ is an aromatic radical and $R_2$ is an alkyl chain having more than two carbon atoms.

8. A disazo dye having the following formula:

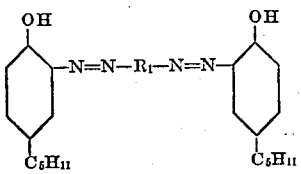

in which $R_1$ is an aromatic radical.

9. Water-insoluble disazo dyes which correspond to the general formula:

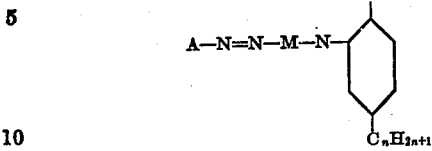

in which A is an aryl radical, M is a radical containing from one to three benzene nuclei, $n$ is a number greater than 2, the dye molecule containing neither groups which lend solubility in water nor nitro groups, these dyes having a high solubility in organic media.

10. Water-insoluble disazo dyes which correspond to the general formula:

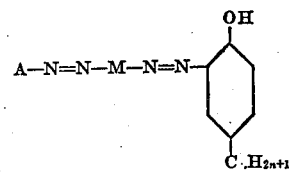

in which A is a radical of the benzene series, M is a radical containing from one to three benzene nuclei, $n$ is a number greater than 2, the dye molecule containing neither groups which lend solubility in water nor nitro groups, these dyes having a high solubility in organic media.

11. The water insoluble disazo dyes which correspond to the general formula:

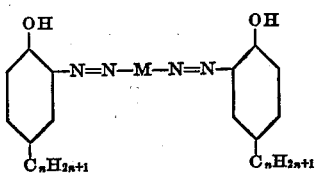

wherein M is a radical containing at least two benzene nuclei, $n$ is a number greater than 2, the dye molecule containing neither groups which lend solubility in water nor nitro groups, these dyes having a high solubility in organic media and a good to very good fastness to light.

12. The water insoluble disazo dyes which correspond to the general formula:

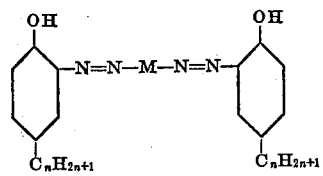

wherein M is a radical containing two benzene nuclei, $n$ is a number greater than 2, the dye molecule containing neither groups which lend solubility in water nor nitro groups, these dyes having a good to very good fastness to light.

13. The process which comprises tetrazotizing a diamine containing at least 2 benzene nuclei, and coupling the tetrazo compound with a phenol of the general formula:

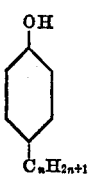

wherein $n$ is a number greater than 2.

14. The process which comprises tetrazotizing a diamine containing at least 2 benezene nuclei, and coupling the tetrazo compound with a phenol of the general formula:

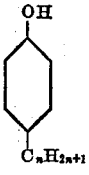

where $n$ is a number greater than 2 and wherein the radical $C_nH_{2n+1}$ contains a branched chain of carbon atoms.

MOSES L. CROSSLEY.